Aug. 28, 1962  A. G. NERHEIM ET AL  3,050,984
GAS DENSITY BALANCE
Filed Sept. 29, 1959  2 Sheets-Sheet 1
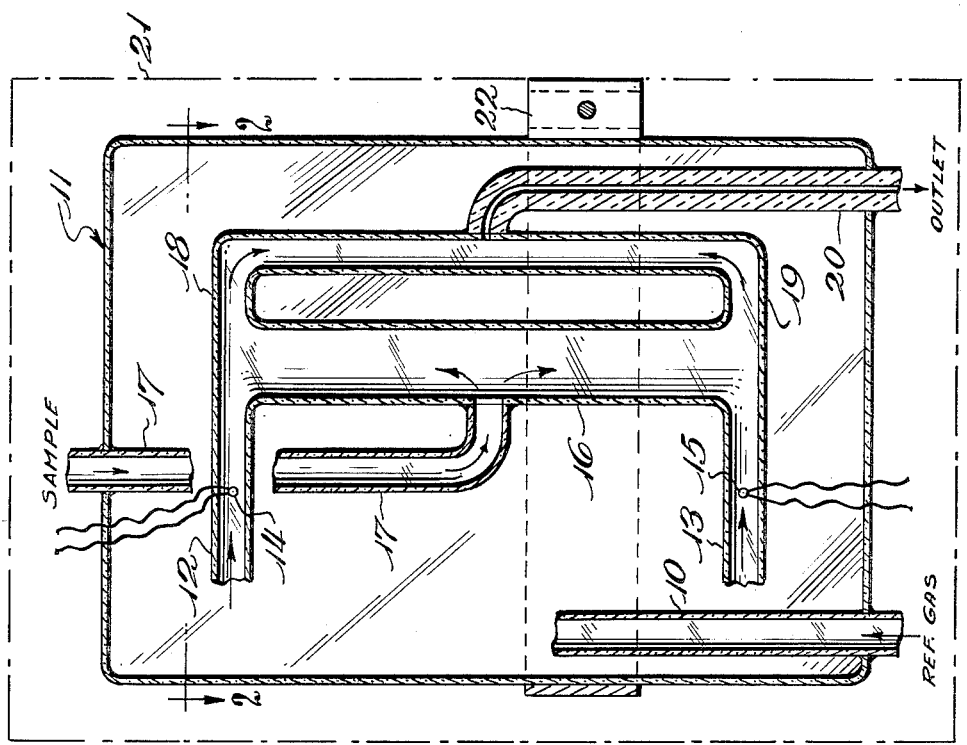
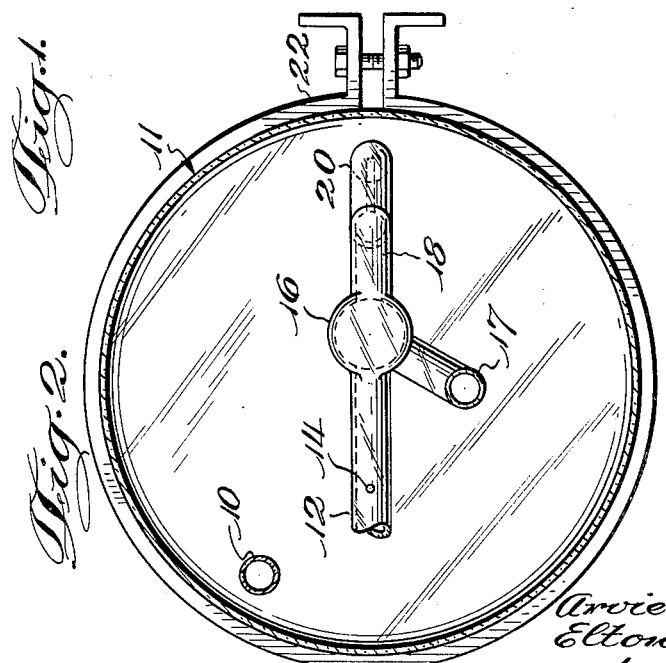
INVENTORS.
Arvie Glenn Nerheim
Elton B. Tucker
By Gerald Rose
attorney

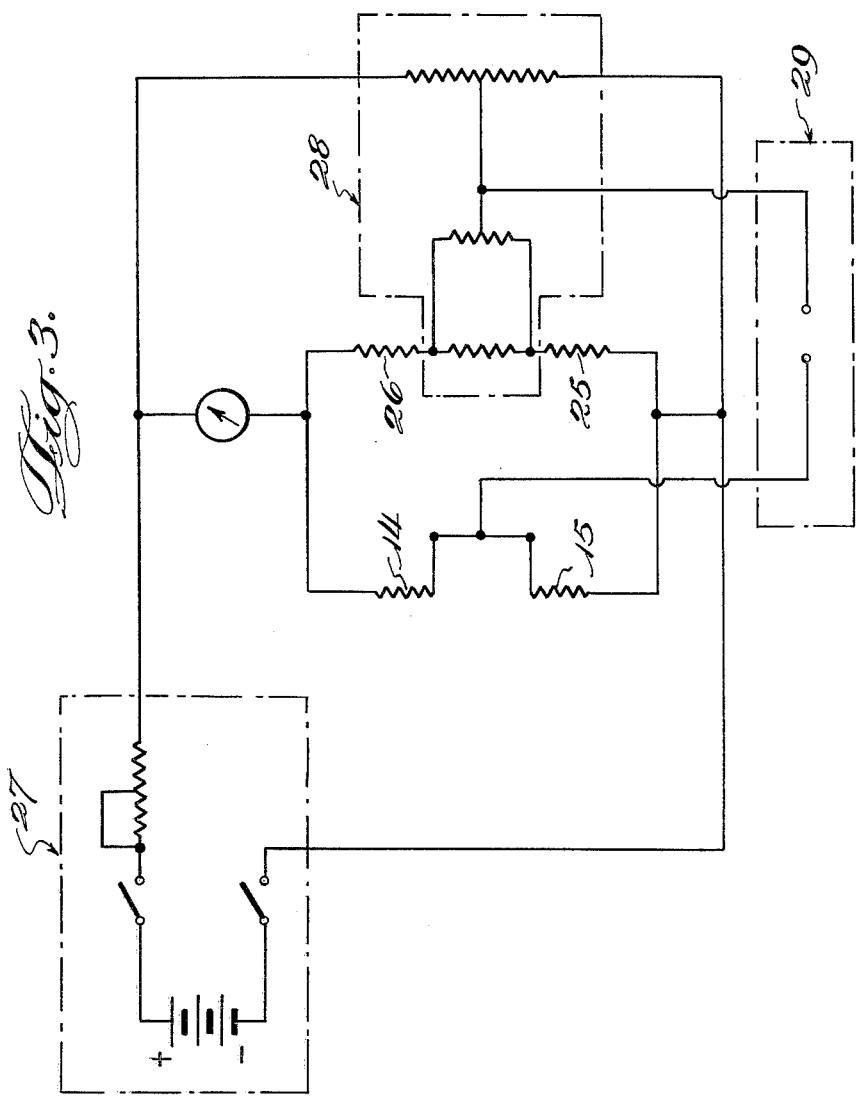

3,050,984
GAS DENSITY BALANCE
Arvie Glenn Nerheim, Crown Point, and Elton B. Tucker, Highland, Ind., assignors to Standard Oil Company, Chicago, Ill., a corporation of Indiana
Filed Sept. 29, 1959, Ser. No. 843,263
9 Claims. (Cl. 73—30)

This invention relates to means for the analyses of fluids by means of measuring the density thereof. More particularly, the invention relates to a system for measuring gas and vapor densities as an adjunct to gas chromatography.

Gas chromatography, a new and useful technique for separation and analysis of complex mixtures of volatile materials, is a system wherein components of such mixtures are separated in simple and inexpensive equipment by partition between a stationary liquid phase and a moving gas phase. A few microliters of sample can be analyzed in a relatively short time and the technique is applicable to samples ranging from fixed gases to those that must be distilled at low pressure.

The separations take place in small elongated columns packed with a specific type of solid packing which supports the stationary liquid phase. The liquid, usually amounting to about 40 weight percent of the packing, is distributed as a thin film that provides a large surface for the gas to contact. Components of a sample are separated as they are carried through the column by a moving carrier gas phase, called the eluting gas, and the components are detected in the eluted gas as they pass from the column. Nitrogen, helium, hydrogen and carbon dioxide are common carrier gases.

Typically one component of a binary mixture is less soluble in the stationary phase than the other and the less soluble component will remain in the gas phase and be swept through the column at nearly the velocity of the eluting gas. The second component, however, will pass through the column at a lower rate because the process of dissolving in and expelling from the stationary liquid phase takes additional time. Because of differences in partition, the first and second components emerge from the column in the eluted gas at different times and thus are separated.

Several types of detectors have heretofore been proposed and tried for sensing the presence of the component in the eluted gas and it is with respect to such detectors that this invention is directed.

Recently, component detectors have been devised which are sensitive to changes in density of the eluted gas due to the presence of a component of the sample. These so-called gas density balances respond to density changes in a manner which is fast, accurate, and insensitive to flow-rate; some balances produce an electrical output which is linear with density. Such balances employ a pair of reference gas flow conduits connected by a sample gas introduction conduit; the differential change in flows of reference gas caused by the introduction of a sample gas of different density is detected and is taken as a measure of sample gas density.

A primary object of the present invention is to provide an improved gas density balance which features exceptional mechanical ruggedness and ease of operation. A further object is to provide a detector of compact size for use in gas chromatography at high, accurately controlled, temperatures. These and other objects and advantages of the invention will become apparent as the description thereof proceeds.

Briefly, in accordance with the invention, we enclose the reference gas flow conduits, the sample gas conduit, and the differential flow detectors of a gas density balance within a manifold chamber which serves the multiple functions of being a manifold for the reference gas, insuring temperature equilibrium in the balance, and protecting the conduits and detectors from mechanical shock.

The preferred type of gas density balance embodying the invention utilizes twin detectors in a flowing reference gas stream and housed within the enclosing chamber. The reference stream, having a composition identical to that of the carrier gas, is split into two streams, each of which passes over one of the twin detectors. These detectors are electrically-heated, temperature-sensitive elements such as tungsten filaments or thermistors. The sample stream is introduced into the apparatus downstream of the twin detectors, and when such sample stream contains a component having a density greater than that of the reference gas, flow tends downward with the result that the reference gas is diverted and the flow over one detector is reduced while the flow over the other is increased. This cools the later detector to a greater extent and permits the other detector to increase in temperature (because of slower dissipation of heat therefrom), causing an imbalance in the electrical bridge circuit including the two detectors. The resulting net change in the electrical resistances of the detectors is then measured as an indication of the density of the gas sample. In such a system not only in all the diverted gas utilized for detections but the two-fold action of cooling one detector and heating the other contributes to increased sensitivity without being adversely affected by rates of flow.

Further details and advantages of the described system will be discussed by reference to the accompanying drawings wherein:

FIGURE I is a semi-schematic sectional view of a type of gas density balance constructed in accordance with the invention;

FIGURE II is a top section view of a preferred arrangement of the apparatus illustrated in FIGURE I.

FIGURE III is a diagrammatic showing of an electrical bridge circuit including the filament detectors and adapted for use in conjunction with the apparatus of FIGURES II and III.

Referring to FIGURE I, the reference gas is introduced by reference gas inlet tube 10 into the mid-point of reference gas chamber 11. This chamber 11 surrounds detector tubes 12 and 13, sample tube 16, and detector filaments 14 and 15. The flow of reference gas from the reference gas chamber 11 is divided between top detector tube 12 and bottom detector tube 13. Detector filaments 14 and 15 are disposed in detector tubes 12 and 13, respectively. The sample tube 16 extends between the top detector tube 12 and the bottom detector tube 13 and is provided with sample inlet 17.

The carrier gas and the reference gas have essentially the same composition. When a gas sample (consisting of a carrier gas and an eluted sample component) entering sample tube 16 contains a sample component having a density greater than that of the reference gas flowing through the balance, the flow in sample tube 16 tends downward. This decreases flow across the bottom detector tube 13 and increases flow across the top detector tube 12. Conversely, a lighter component moves the flow in tube 16 upward. This results in a net change in the resistances of the filaments 14 and 15 which change is measured as an indication of the density of the gas sample introduced into the balance.

The reference gas of now differing flow rate passes from top detector tube 12 into top outlet tube 18 and from bottom detector tube 13 into bottom outlet tube 19. The combined flow from outlet tubes 18 and 19 emerges from the balance by way of outlet tube 20 which is a flow-restrictive capillary.

Referring to FIGURE II, the dimensions of the apparatus schematically shown in FIGURE I have been chosen to make the most effective use of any change in density to vary the filament resistances. In FIGURE II, the reference gas inlet tube 10 has an I.D. of 4 mm., the cylindrical reference gas chamber 11 is about 70 mm. high with a diameter of about 60 mm. The reference gas inlet tube 10 is shown as extending through the bottom wall of the reference gas chamber 11 and it is contemplated that such inlet tube 10 may alternatively enter the chamber 11 through the top wall or a side wall. In any event, it is desired to provide for the discharge of the reference gas from the inlet tube 10 at about the geometric center of the chamber 11.

The top and bottom detector tubes 12 and 13 have an I.D. of about 4 mm. The sample tube 16 has an I.D. of about 8 mm., and the sample inlet 17 comprises an elbow having an I.D. of about 1 mm. The outlet capillary tube 20, receiving flow from the top and bottom outlet tubes 18 and 19, has an I.D. of about 0.7 mm. and a length of 60 mm.

One objective in selecting these dimensions is to maximize the effect of change in density caused by the sample and to minimize the pressure drop caused by friction of gas flow, so as to obtain high sensitivity to changes in density consistent with linearity and speed of response.

The sample tube 16 is kept to a small volume to give a fast response. Increasing the height of the sample tube 16 increases the driving force of the differences in density but it also increases friction and volume; increasing the diameter of the sample tube 16 also increases volume but it has the beneficial effect of decreasing friction. It tends to compensate for viscosity whereas the effects of viscosity may otherwise be such as to cause non-linear response.

As the driving force is expended in the top and bottom detector tubes 12 and 13, the resistances of the filaments 14 and 15 change with change in temperature which, in turn, reflects the changes in rates of flow over the filaments. Minimizing friction in the balance can be expected to give the largest change in velocity and hence largest electrical resistance change in the filaments. On the other hand, friction insures linear response at low flow rates. Detector tubes 12 and 13 could be shortened to reduce friction but this, if carried to an extreme, would allow some sample to reach the filaments 14 and 15 and make the response non-linear. Thus the arrangement and dimensions given provide a gas density balance which satisfies the need for a gas chromatographic analysis detector that is sensitive, fast, and requires no calibration for individual compounds. It is contemplated that balances of other characteristics may be devised in view of the description herein given. For example, an even faster detector may be designed by reducing the height of the sample tube 16 by 50 percent or more. If more sensitivity is needed, the height and diameter of the sample tube 16 can be increased and the length of the detector tubes 12 and 13 may be shortened, although this latter modification would run the risk of allowing some sample to reach the filaments and make the response non-linear as discussed above.

The complete unit is housed within a temperature-controlled cabinet 21 and supported within the cabinet 21 by any suitable means, such as a bracket 22 clamped to the reference gas chamber 11, for example. It will be apparent that the reference gas inlet tube 10 extends through a bottom wall of the cabinet 21 and that the outlet capillary tube 20 projects through a bottom or an end wall thereof. Suitable temperature control means including heaters, thermostats, and the like can be provided for controlling the temperature of the cabinet 21. A primary advantage of the compact design of the present detector is that temperature equilibrium is easily attained as a result of the large volume of the reference gas chamber 11 relative to the size of the several tubes or conduits. This is of extreme importance when employing a gas density balance for high temperature analyses, especially where the reference gas is not effectively preheated. Since temperature control systems are well known in the art, details are not given here.

Referring to FIGURE III, there is shown a Wheatstone bridge circuit with standard resistances 25 and 26 and the detector filaments 14 and 15 comprising hot wire resistance elements. A constant voltage supply 27, a zero adjusting means 28, and an output voltage-responsive means such as recorder 29, complete a typical bridge circuit. This general type of bridge circuit and its operation are well known and will not be described in further detail.

The top and bottom detector tubes 12 and 13 within chamber 11 contain the hot wire elements 14 and 15, respectively, which are preferably precise lengths of tungsten wire, but it is also contemplated that they may be replaced by thermistors, i.e. semi-conductor element having negative resistance characteristics in which an increase in temperature of the resistance element effects a large decrease in its resistance. Such a detector element would also increase sensitivity of the balance.

The apparatus may be fabricated of any suitable gas-impervious material. Glass is convenient, although for improved temperature control a stainless steel or brass construction is to be preferred.

Although the invention has been described with reference to a preferred embodiment thereof and in combination with a particular type of gas density balance, it is to be understood that these are by way of illustration only. Accordingly, it is contemplated that modifications and variations can be made in the apparatus by those skilled in the art in light of the preceding description without departing from the spirit of the invention.

We claim:

1. In a gas density balance apparatus having a pair of reference gas flow conduits, one portion of each of said conduits being open to receive reference gas and another portion of said conduits discharging externally of said balance, a vertically elongated sample introduction conduit communicating between said flow conduits, sample gas inlet means on said sample introduction conduit intermediate the ends thereof, and means for determining differentials in rates of flow through said flow conduits caused by a sample having a density different from that of the reference gas, the improvement comprising a manifold chamber surrounding said reference gas flow conduits, said sample introduction conduit and said differentials determining means, said chamber having a reference gas inlet thereto whereby reference gas passes into the chamber and thereafter into the pair of reference gas flow conduits contained therein.

2. The apparatus of claim 1 wherein said means for determining differentials in rates of flow through the reference gas flow conduits comprise flow-responsive detector means disposed in said flow conduits and responsive to the rates of flow of reference gas therethrough.

3. The apparatus of claim 2 wherein said detector means comprises a pair of electrically-heated temperature-sensitive elements, one in each flow conduit, connected in a bridge circuit.

4. An apparatus for measuring the density of a gas which comprises a reference gas chamber, means for flowing a reference gas into said reference gas chamber at a constant rate, a pair of symmetrically arranged reference gas flow tubes disposed in said reference gas chamber, the inlet end of each of said tubes communicating with the inside of said reference gas chamber, substantially vertical sample-introduction tube means communicating between said symmetrical reference gas flow tubes, a sample gas introduction conduit communicating with said sample introduction tube intermediate the ends thereof, a pair of outlet tubes communicating with the outlet ends of said detector tubes, capillary outlet tube means through which said outlet tubes discharge to the outside of said reference gas chamber, and electrical means in said reference gas flow tubes responsive to rates of flow therethrough.

5. The apparatus of claim 4 wherein said electrical means comprises electrically-heated temperature-sensitive filaments in a bridge circuit.

6. A gas density balance used in gas chromatography and comprising in combination a reference gas manifolding chamber, vertically elongated sample tube disposed in said manifolding chamber, top and bottom detector tubes within said manifolding chamber and communicating with the top and bottom ends of said sample tube, respectively, outlet tube means communicating with the said detector tubes, capillary means through which said outlet tubes discharge to the outside of said manifolding chamber, flow-responsive means disposed within said detector tubes, reference gas inlet means discharging into said manifolding chamber, and sample gas inlet means on said sample tube intermediate the ends thereof.

7. An apparatus for measuring the density of a gas comprising a vertically elongated reference gas chamber, a reference gas inlet tube discharging into said chamber, a first detector tube in said reference gas chamber, a second detector tube in said reference gas chamber similar in geometry to said first detector tube and vertically disposed with respect thereto, a sample gas tube arranged with one end merged with said first detector tube and a second end merged with said second detector tube, means for introducing a sample gas under test into said sample tube, a first outlet tube and a second outlet tube into which said first detector tube and said second detector tube discharge, respectively, a third outlet tube into which said first and second outlet tubes discharge, said third outlet tube in turn discharging outside of the reference gas chamber, and flow-responsive detector means in said first and second detector tubes upstream of said points where the ends of said sample tube merge with said detector tubes.

8. Apparatus of claim 7 wherein said detector means comprise filament detectors.

9. Apparatus of claim 7 wherein said detector means comprise thermistor detectors.

References Cited in the file of this patent

UNITED STATES PATENTS 2,728,219    Martin  ---------------- Dec. 27, 1955

OTHER REFERENCES

Article in Vapor Phase Chromatography by Desty (Butterworths' Scientific Publications, London, 1956), pages 146–153 (article by Munday and Primavesi). (Copy in P.O. Library.)